United States Patent
Rajvanshi et al.

(10) Patent No.: US 10,452,755 B2
(45) Date of Patent: Oct. 22, 2019

(54) HIERARCHICAL NAVIGATION CONTROL

(71) Applicant: Microsoft Technology Licensing, LLC, Redmond, WA (US)

(72) Inventors: Prateek Rajvanshi, Delhi (IN); Niraj Yadav, Rajasthan (IN); Prabhat Kumar Pandey, Herndon, VA (US); Hemant Raj, Hyderabad (IN); Paridhi Verma, Lucknow (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 447 days.

(21) Appl. No.: 14/643,191

(22) Filed: Mar. 10, 2015

(65) Prior Publication Data

US 2016/0267063 A1    Sep. 15, 2016

(51) Int. Cl.
*G06F 17/22* (2006.01)
*G06Q 10/08* (2012.01)
*G06F 3/048* (2013.01)

(52) U.S. Cl.
CPC .......... *G06F 17/2241* (2013.01); *G06F 3/048* (2013.01); *G06Q 10/087* (2013.01)

(58) Field of Classification Search
CPC ......... G06F 17/30873; G06F 17/30876; G06F 17/30941; G06F 17/30961; G06F 17/30994
See application file for complete search history.

(56) References Cited

U.S. PATENT DOCUMENTS

| | | | |
|---|---|---|---|
| 7,818,683 B2 | 10/2010 | Sorin et al. | |
| 8,010,910 B2 | 8/2011 | Wright et al. | |
| 8,156,448 B2* | 4/2012 | Niyogi | G06F 17/30905 715/703 |
| 8,316,323 B2 | 11/2012 | Saraiya et al. | |
| 8,539,330 B2 | 9/2013 | Dovin et al. | |
| 8,572,058 B2 | 10/2013 | Reid et al. | |
| 8,868,593 B1* | 10/2014 | Zhang | G06F 17/30554 707/769 |
| 2001/0045965 A1* | 11/2001 | Orbanes | G06F 3/0346 715/841 |
| 2002/0078016 A1 | 6/2002 | Lium et al. | |
| 2003/0172078 A1* | 9/2003 | Stumpf | G06F 17/30961 |
| 2005/0131945 A1* | 6/2005 | Muller | G06F 9/451 |
| 2006/0155746 A1* | 7/2006 | Abrams | G06F 17/30961 |

(Continued)

OTHER PUBLICATIONS

Lee Underwood, "Howto Create a JavaScript Breadcrumb Script." Jan. 31, 2005, pp. 1-4, http://www.webreference.com/js/scripts/breadcrumbs/.*

(Continued)

*Primary Examiner* — Nicholas Klicos
(74) *Attorney, Agent, or Firm* — Christopher J. Volkmann; Kelly, Holt & Christenson, PLLC

(57) ABSTRACT

A user interaction is detected, selecting a unit with a user input mechanism. A unit hierarchy path that is used to categorize units, is accessed and a node in the unit hierarchy path, corresponding to the selected unit, is identified. A set of ancestor nodes in the unit hierarchy path is also identified, and a user interface breadcrumb control is generated based upon the selected unit and the identified ancestor nodes. A display system is controlled to render a display page for the selected unit, along with the breadcrumb control.

16 Claims, 13 Drawing Sheets

(56) References Cited

U.S. PATENT DOCUMENTS

| | | | | |
|---|---|---|---|---|
| 2006/0282765 | A1* | 12/2006 | Hintermeister | G06F 17/30873 715/209 |
| 2007/0180361 | A1* | 8/2007 | Dovin | G06F 17/30876 715/234 |
| 2009/0063547 | A1* | 3/2009 | Wright | G06F 17/30274 |
| 2010/0049766 | A1* | 2/2010 | Sweeney | G06F 17/30705 707/737 |
| 2010/0235203 | A1* | 9/2010 | Baskin | G06Q 10/08 705/7.37 |
| 2011/0035345 | A1* | 2/2011 | Duan | G06F 17/30873 706/12 |
| 2011/0218845 | A1* | 9/2011 | Medina | G06Q 30/0208 705/14.11 |
| 2013/0173593 | A1 | 7/2013 | Nations et al. | |
| 2014/0180881 | A1* | 6/2014 | Krueger | G06Q 10/06 705/28 |

OTHER PUBLICATIONS

John Coggeshall, "Breadcrumb Navigation." Apr. 10, 2001, pp. 1-4, http://www.zend.com/zend/spotlight/breadcrumb28.php.*
Whitewater.be, "Breadcrumbing Using Cookies." Feb. 16, 2003, pp. 1-2 http://www.whitewater.be/script/result.asp?action=view&id=82.*
Navigation FAST Pack User Guide—Published Date: 2009 http://download.softpress.com/downloads/Navigation_Pack_User_Guide.pdf (28 pages).*
Are SharePoint Breadcrumbs completely wrong?—Published Date: May 2, 2008 http://www.novolocus.com/tag/breadcrumbs/ (11 pages).*
Ahmed et al., "Navigation in Information Space: How Does Spatial Ability Play a Part?", IADIS International Conference on Web Based Communities, 2005, pp. 119-125.*
Blustein et al., "An Evaluation of Lookahead Bredcrumbs for the WWW", ACM Press, New York, USA, 2005, pp. 202-204.*
Maldonado et al., "Do Common User Interface Design Patterns Improve Navigation?", Proceedings of the Human Factors and Ergonomics Society 46th Annual Meeting, 2002, pp. 1315-1319.*
ABE Crystal and Jesse Wilbur, "Who's My Daddy? An Approach to Decentralized Information Architecture", CHI '04, Extended Abstracts on Human Factors in Computing Systems, 2004, 1 pg.*
Keith Instone, "Location, path & attribute breadcrumbs", Poster, ASIST 3rd Annual 1A Summit (Mar. 2002).*
Oracle Technology Network, "Locator element: breadcrumbs", http://www.oracle.com/technology/tech/blaf/specs/locatorBreadcrumbs.html, printed Oct. 6, 2004 (11 pgs).*
"ATG Commerce Reference Store Overview", Published on: Jan. 26, 2013, Available at: https://docs.oracle.com/cd/E36434_01/CRS.10-1-2/ATGCRSOverview/html/s0305breadcrumbtrail01.html.
Hu, Shiyang, "eCommerce Web Design: Breadcrumb Navigation ", Published on: Dec. 8, 2014, Available at: http://www.tmogroup.asia/ecommerce-web-design-breadcrumb-navigation/.
Holst, Christian, "An E-Commerce Study: Guidelines for Better Navigation and Categories", Published on: Nov. 11, 2013, Available at: http://smashingmagazine.com/2013/11/11/guidelines-navigation-categories-ecommecce-study/.
Talvensaari, Aapo, "A Single Breadcrumb for All SharePoint Pages", Published on: Feb. 8, 2010, Available at: http://www.sharepointblues.com/2010/02/08/a-single-breadcrumb-for-all-sharepoint-pages/.
"Breadcrumb Edit Control", Retrieved on: Dec. 9, 2014, Available at: https://documentation.devexpress.com/#WindowsForms/CustomDocument16973.
"Oracle® Fusion Applications Administrator's Guide", Published on: Jan. 13, 2013, Available at: https://docs.oracle.com/cd/E29505_01/fusionapps.1111/e14496/gs_mgmt.htm.
"Retail Product Hierarchy (Form) [AX 2012]", Retrieved on: Dec. 9, 2014, Available at: http://technetmicrosoft.com/en-us/library/hh597208.aspx.
Fernando, Divi, "Breadcrumb Navigation: A Guide on Types, Benefits and Best Practices", Published on: Nov. 3, 2014, Available at: http://blog.woorank.com/2014/11/breadcrumb-navigation-guide/.
Vaidya, Ajay, "Effective Hierarchy Management using SAP NetWeaver MDM for Retail", Retrieved on: Dec. 9, 2014, Available at: http://www.sdn.sap.com/irj/scn/go/portal/prtroot/docs/library/uuid/70ee0c9e-29a8-2910-8d93-ad34ec8af09b?QuickLink=index&overridelayout=true&11948599027632.
"Microsoft Dynamics CRM Customer Center", Published on: Dec. 10, 2014, Available at: http://www.microsoft.com/en-us/dynamics/crm-customer-center/what-s-new.aspx.
Majer, Peter, "Dynamics CRM 2015 Hierarchy Visualizations", Published on: Sep. 23, 2014, Available at: http://blog.sonomapartners.com/2014/09/dynamics-crm-2015-hierarchy-visualizations.html.
"Understanding Custom Site Navigation", Published on: May 6, 2012, Available at: http://msdn.microsoft.com/en-us/library/ff649108.aspx.
"User Interface Elements", Published on: Jun. 8, 2013, Available at: http://www.usability.gov/how-to-and-tools/methods/user-interface-elements.html.

* cited by examiner

FIG. 2C

ACME CRM — Sales | ▼ Products | ▼ Product ACME: Tabl...

PUBLISH  CLONE  DELETE  EMAIL A LINK  RUN WORKFLOW  START DIALOG  RUN REPORT

Product: CRM online professional     Status* | Draft

! Warning: A default price list has not been set.

SUMMARY

Name*: CRM online professional
Product ID*: CRM Professional
Family Hierarchy: ACME 123 > CRM Service  ← 248
Valid From: --
Valid To: --
Description: --

— 244
— 246

Unit Group*: Business User
Default Unit*: Standard User
Default Price List+: --
Decimals Supported*: 0
Subject: --

PRODUCT PROPERTIES

| Name | Base Property | Data Type | Read Only | Required | Hidden | Default Value |
|---|---|---|---|---|---|---|
| Subscription Duration (days) | | Whole number | No | Yes | No | 365 |
| URL | | Single Line of Text | No | No | No | <URL> |

HIERARCHICAL NAVIGATION CONTROL

BACKGROUND

Computing systems are currently in wide use. Computing systems are often used by organizations in order to assist them in carrying out tasks, activities, and workflows.

Some computing systems have entities or data records that represent physical objects or physical units. For instance, some organizations use computer systems that have entities or records that represent products, equipment, or other physical units.

In such systems, a computing system may control a display system in order to display a page (or form) corresponding to a selected one of the entities. The form can have user input mechanisms that detect a wide variety of user interactions.

The discussion above is merely provided for general background information and is not intended to be used as an aid in determining the scope of the claimed subject matter.

SUMMARY

A user interaction is detected, selecting a unit with a user input mechanism. A unit hierarchy path that is used to categorize units, is accessed and a node in the unit hierarchy path, corresponding to the selected unit, is identified. A set of ancestor nodes in the unit hierarchy path is also identified, and a user interface breadcrumb control is generated based upon the selected unit and the identified ancestor nodes. A display system is controlled to render a display page for the selected unit, along with the breadcrumb control.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 2A-2D show examples of user interface displays.

DETAILED DESCRIPTION

Figure 1:
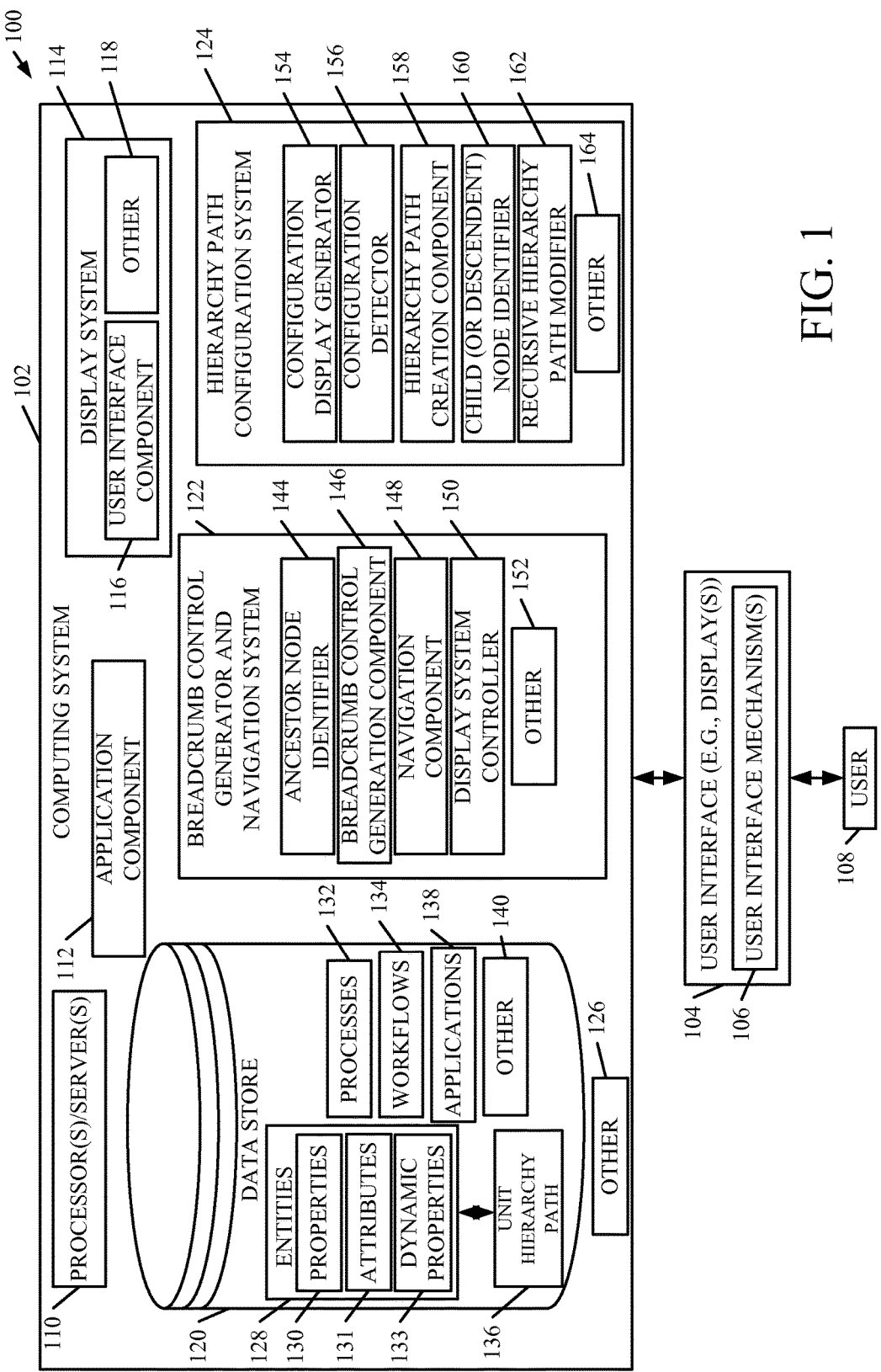
FIG. 1 is a block diagram of one example of a computing system architecture.

FIG. 1 is a block diagram of one example of a computing system architecture 100. Architecture 100 illustratively includes computing system 102 that is shown generating user interfaces (such as user interface displays) 104 with user input mechanisms 106 for interaction by user 108. User 108 illustratively interacts with user input mechanisms 106 in order to control and manipulate computing system 102.

In the example shown in FIG. 1, computing system 102 illustratively includes processors or servers 110, application component 112, display system 114 (which, itself, can include user interface component 116 and other items 118), data store 120 breadcrumb control generator and navigation system 122, hierarchy configuration system 124, and it can include other items 126. Data store 120, itself, illustratively includes one or more entities 128 which can be defined by, or include, properties 130, attributes 131, and dynamic properties 133 (which can, themselves, be in a separate entity). Data store 120 also illustratively includes processes 132, workflows 134, a unit hierarchy path 136, applications 138, and it can include other items 140. In one example, as is described in greater detail below, unit hierarchy 136 can be stored as an attribute for each entity. It is shown separately in FIG. 1 for the sake of example and discussion only. It will also be noted that data store 120, or other components of system 102, may be separate from system 102 and accessed by system 102. This is also described in greater below.

Breadcrumb control generator and navigation system 102 illustratively includes hierarchy accessing component 142, ancestor node identifier 144, breadcrumb control generation component 146, navigation component 148, display system controller 150, and it can include other items 152. Hierarchy path configuration system 124 illustratively includes configuration display generator 154, configuration detector 156, hierarchy creation component 158, child (or descendant) node identifier 160, recursive hierarchy path modifier 162, and it can include other items 164.

Before describing the operation of architecture 100 in more detail, a brief description of a number of the items in architecture 100, and their operation, will first be provided. It will be noted that this is provided by way of overview and example only.

Entities 128 can illustratively represent physical units or physical items, or other items, within computing system 102. For instance, when an organization that uses computing system 102 manufactures or sells products, then entities 128 can represent the products or groups of products, such as product families. Properties 130 can illustratively represent physical (or other) characteristics of the products or other entities. By way of example, if a particular entity 128 represents a tablet computer, then the properties 130 may illustratively represent the color of the tablet computer, the software installed on the tablet computer, the battery size, the screen size, among a wide variety of other physical or other characteristics of the product. Of course, when entity 128 represents a different unit, then the properties 130 illustratively represent the characteristics of that particular unit. Attributes 131 can also represent certain aspects of an entity 128, such as its identifier, name, etc.

Unit hierarchy path 136 is shown separately in FIG. 1, but can be stored as an attribute of each entity 128 that represents a unit (e.g., product or family) in system 102. For instance, it can be a text attribute that illustratively represents a location in a hierarchy of the various units or families of units represented in computing system 102, where the unit corresponding to the entity 128 belongs. The unit hierarchy can be provided for purposes of organizing those units, or for other reasons. By way of example, the unit hierarchy path 136 corresponding to an entity 128 that represents a tablet computer having a brand X and a model number Y may be represented as follows:

Electronics->Computers->Tablet Computers->Brand X Table Computers->Brand X, Model Y, Tablet Computers . . .

This path can be stored as an attribute of the corresponding entity 128. It can thus be seen that the nodes to the left in the above hierarchy path are ancestor nodes relative to those on the right. The nodes to the right are descendant nodes relative to the nodes on the left. In an example where computing system 102 is used by a relatively large organization, such as an enterprise organization, computing system 102 may have thousands of different unit hierarchies to classify all of the various products or services of the organization. The entity corresponding to the hierarchy path shown above (e.g., the entity representing the tablet computer of brand X and model Y) can have an attribute that points to a parent node in the hierarchy. The hierarchy path can thus be constructed by following these pointers from entity-to-entity. User 108 may wish to add units to the unit hierarchy. In that case, hierarchy path configuration system 124 uses configuration display generator 154 to generate a user interface display that allows user 108 to do this. Configuration detector 156 detects user interactions, and hierarchy path creation component 158 can be used to generate additional nodes or paths in the unit hierarchy (and to add the paths to desired entities) to identify the particular additions that user 108 has made, based on the detected user interactions. When user 108 changes a node in unit hierarchy path 136 on an entity, then child (or descendent) node identifier 160 identifies all the children of the changed node, and recursive hierarchy path modifier 162 recursively modifies the hierarchy paths for all of those descendent nodes.

During runtime, user 108 may wish to view a page or form corresponding to a unit (such as an entity 128). In that case, hierarchy accessing component 142 accesses unit hierarchy path 136 on the corresponding entity or unit that the user is viewing. Breadcrumb control generation component 146 generates a breadcrumb control that identifies the ancestor nodes, and display system controller 150 controls display system 114 (and user interface component 116) to display the page or form corresponding to the unit that user 108 has selected, and to also display the breadcrumb control. In one example, the breadcrumb control contains navigatable links, and navigation component 148 controls navigation for user 108, based on user actuation of the navigatable links. Also, in one example, breadcrumb control generation component 146 or controller 150 can limit the number of ancestor nodes displayed in the breadcrumb control. This may be the case, for instance, where the field on the display has limited space. The breadcrumb control may then be limited to the three closet ancestor nodes, or to another subset of ancestor nodes. This is but one example.

Application component 112 illustratively runs applications 138 that may perform processes 132 or workflows 134, etc. It may also access unit hierarchy path 136 and operate on entities 128 or other records 140.

Figure 2:
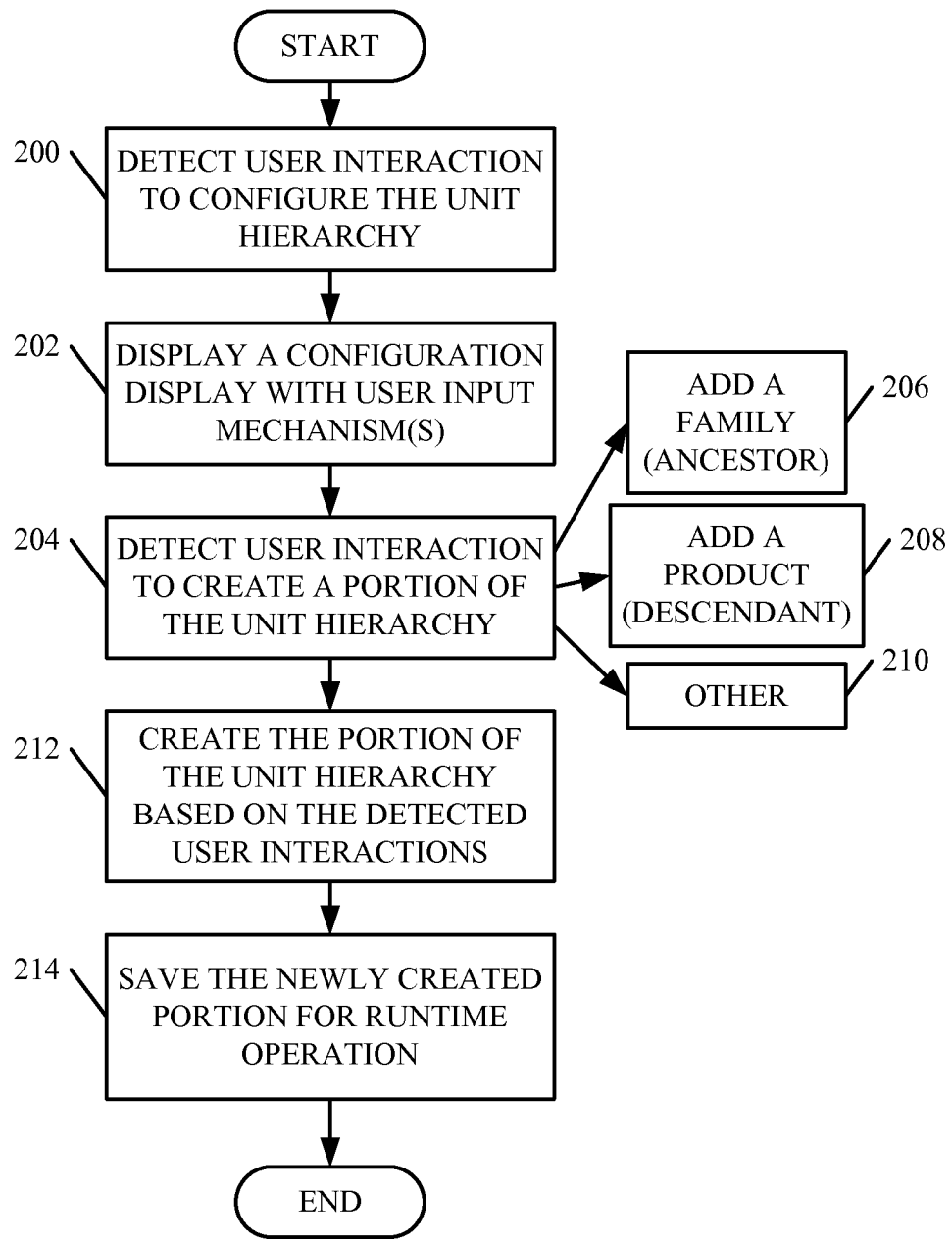
FIG. 2 is a flow diagram illustrating one example of the operation of a hierarchy configuration system.

FIG. 2 is a flow diagram illustrating one example of the operation of hierarchy path configuration system 124, in allowing user 108 to add a portion to unit hierarchy path 136. System 124 first detects a user interaction indicating that the user wishes to configure the unit hierarchy path 136. This is indicated by block 200 in FIG. 2. Configuration display generator 154 illustratively controls display system 114 and user interface component 116 to display a configuration display with user input mechanisms that can be actuated by user 108 in order to configure a unit hierarchy path 136. This is indicated by block 202.

Configuration detector 156 then detects user interaction with the user input mechanisms. The detected user interactions illustratively indicate that the user wishes to create a portion of (or add a portion to) a unit hierarchy path 136 on a given page. This is indicated by block 204. For instance, the user may provide an input indicating that the user wishes to add a product family (or ancestor) node to unit hierarchy path 136. This is indicated by block 206. In another example, configuration detector 156 may receive an input indicating that the user wishes to add a product leaf node (or descendent node) to unit hierarchy path 136. This may be the case, for instance, when user 108 wishes to classify a new product in the unit hierarchy. This is indicated by block 208. Configuration detector 156 may detect user interaction indicating that the user wishes to create a portion of a unit hierarchy path 136 in other ways, and this is indicated by block 210.

In response to the detected user interactions, hierarchy creation component 158 illustratively creates the desired portion of the unit hierarchy path 136, based on the detected user interactions. This is indicated by block 212. For instance, where the user wishes to create a new product family in the unit hierarchy, and add products to that family, then hierarchy creation component 158 illustratively generates the branches in the unit hierarchy that represent the new family nodes and the newly added product nodes. This, of course, is only one example.

Figure 2A:
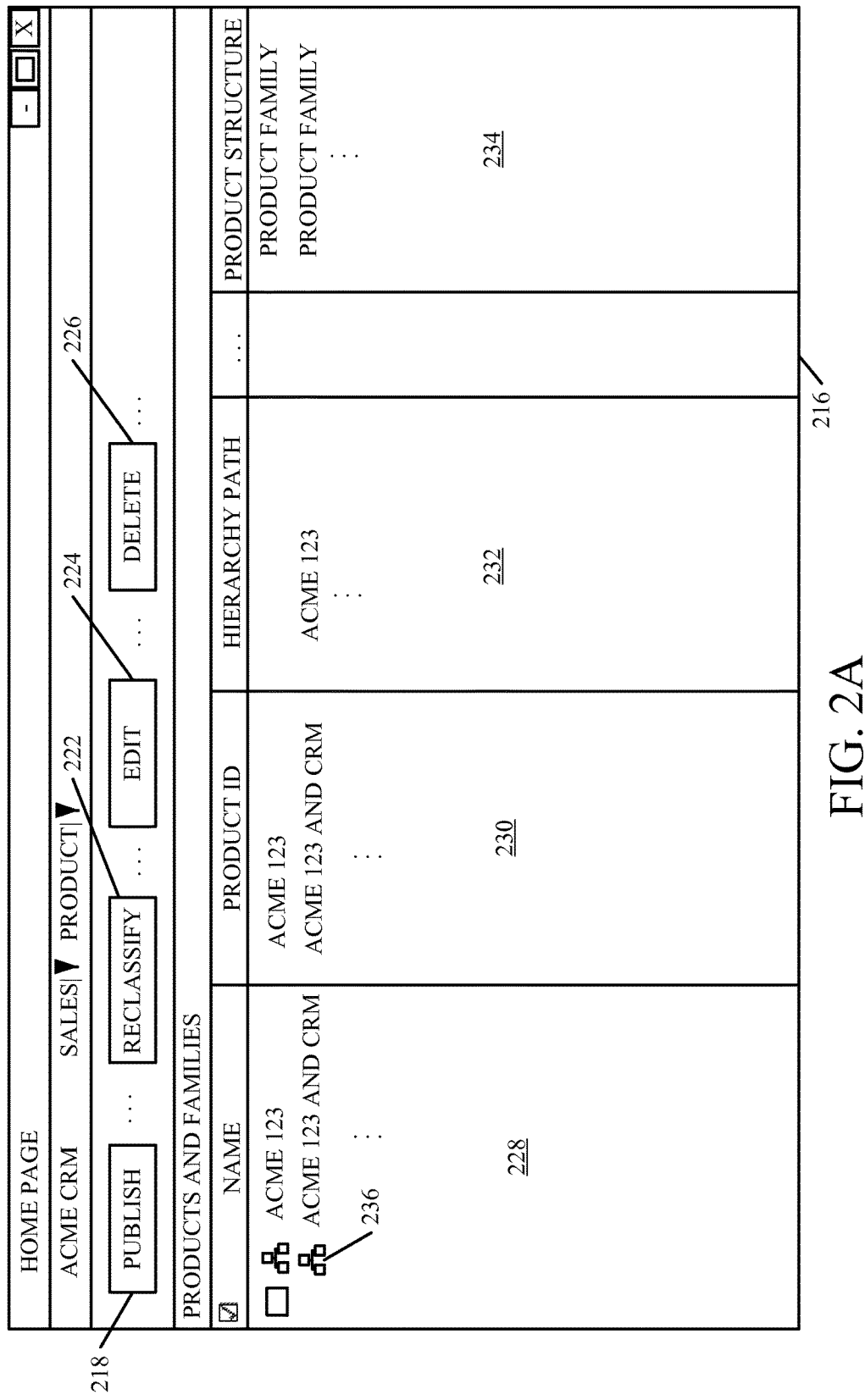
Figure 2B:
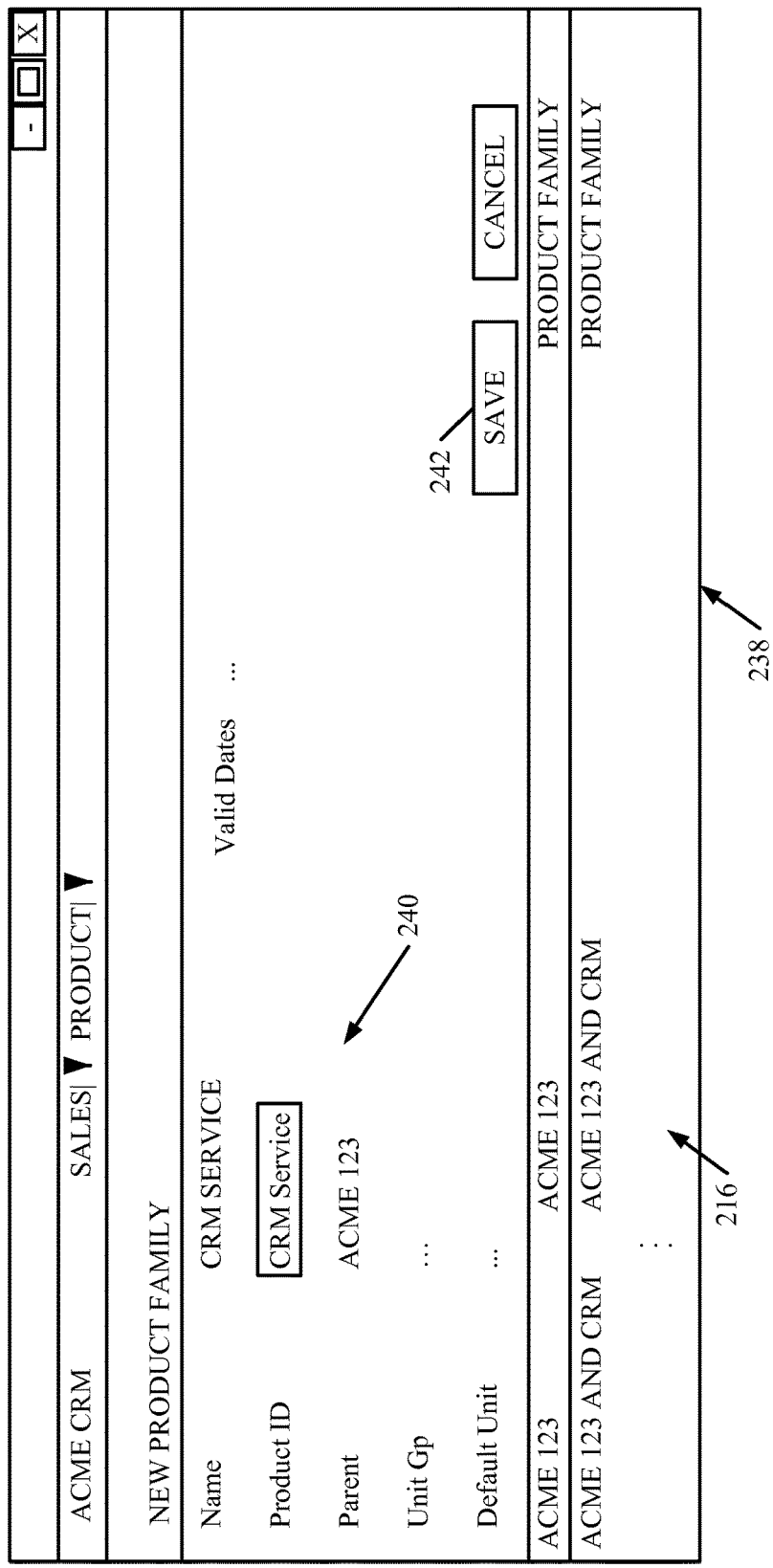

Component 158 then saves the unit hierarchy path 136, with the newly created portion, on the desired entity, for runtime operation or for access by other computing systems. This is indicated by block 214 in FIG. 2. FIGS. 2A-2C show examples of user interface displays that indicate one example of how a user may provide inputs to create various portions of unit hierarchy path 136.

FIG. 2A shows one example of a user interface display 216. Display 216 can, for example, be a homepage (or landing page) display of a computing system 102 that deploys a customer relations management (CRM) system. It can be seen that display 216 is a grid display that displays products and families in the CRM system deployed by computing system 102. Display 216 illustratively has a number of user input mechanisms that can be actuated by the user to perform certain actions. Publish mechanism 218, when actuated by the user, allows the user to publish the products and families in various ways. Reclassify actuator 220, when actuated by the user, allows the user to reclassify or otherwise reconfigure a portion of a unit hierarchy path 136. This is described in greater detail below with respect to FIG. 4. Edit and delete mechanisms 224 and 226, respectively, allow the user to edit or delete various items in the grid display.

The grid display includes a name portion 228, a product ID portion 230, a hierarchy path portion 232, and a product structure portion 234. Name portion 228 includes a set of names of various nodes within a unit hierarchy path 136. They can include a hierarchy path indicator (such as indicator 236) that indicates that there are dependent nodes from the named node. Therefore, it can be seen that the first node ("ACME 123") is a product family entity and represents a product family node in unit hierarchy path 136. It has no hierarchy path (meaning that it has no other ancestor or parent nodes). It is thus a root node in the product hierarchy path 136. The "ACME 123 and CRM" node has, as its hierarchy path, the "ACME 123" node. Thus, it can be seen in the grid display in FIG. 2A that the "ACME 123 and CRM" node is a direct descendent of the "ACME 123" node in unit hierarchy path 136.

FIG. 2A also shows an example in which a product family can have, as a descendent node, another product family. For instance, the "ACME 123 and CRM" node represents a product family, and it is a descendent of the "ACME 123" node, which also represents a product family. In one example, the user can provide an input indicating that the user wishes to configure a unit hierarchy path 136 starting from display 216. For instance, to edit the path (in one example) the user can actuate edit mechanism 224. In another example, the user can actuate the hierarchy indicator 236. In yet another example, the user can right click on a node in name portion 228 (or elsewhere) to view a drop down display, etc. In any of these cases, configuration display generator 154 can generate a configuration user interface display with user input mechanisms that allow a user to configure the desired unit hierarchy path 136 starting from the identified node. For instance, the user input mechanisms may allow a user to add a product family, to add a product, etc.

FIG. 2B shows an example of a user interface display 238 that can be displayed by configuration display generator 154, when the user actuates a user input mechanism indicating that the user wishes to add a new product family to unit hierarchy path 136, and depending from a node that was selected in grid display 216. It can be seen that the bottom portion of display 238 shows a portion of grid display 216 with the "ACME 123" product family node selected. Thus, the new user interface display 238 allows the user to add a new product family that is a descendent of the "ACME 123" product family node shown in grid display 216.

Display 238 includes a set of user input mechanisms 240 that allow the user to specify the product family being added. For instance, it can be seen that the user has interacted with the user input mechanisms to indicate that the name of the product family will be "CRM Service" and that will also be its product identifier. It can also be seen that the parent node of the new family will be the "ACME 123" node in unit hierarchy path 136. In one example, the parent node is automatically identified based on the user's selection of that node in grid display 216. In another example, the user can modify the parent node by actuating the user input mechanism and entering a different parent node. Any such user interactions are detected by configuration detector 156. When the user is finished configuring the unit hierarchy path 136, the user can actuate a suitable user input mechanism, such as save button 242. Hierarchy creation component 158 then saves the added hierarchy elements to the unit hierarchy path 136 for the selected entity (e.g., the entity that represents the product or product family) in data store 120, for use by the runtime system.

In another example, configuration display generator 154, configuration detector 156, and hierarchy creation component 158, also walk the user through a similar experience that allows the user to add a product node in unit hierarchy path 136. The product node will illustratively be a dependent node from a product family node. In one example, the user illustratively adds a product named "CRM Online Professional" as a dependent node from the "CRM Service" family node which, itself, depends from the "ACME 123" product family node. In that case, the hierarchy path 136 for the newly created product node will be as follows:

ACME 123->CRM Service->CRM Online Professional

Thus, if the user wishes to verify that the proper breadcrumb control is placed on the user interface display for that product, the user can navigate to that product user interface display. FIG. 2C shows one example of this. It can be seen that the display is a product user interface display (or product form) corresponding to the newly added product as identified generally at 244. Summary information 246 also identifies the newly added product. The "family hierarchy" display element displays the breadcrumb control 248 which shows all (or a desired subset) of the ancestor nodes in unit hierarchy path 136, in order of dependency, for the newly added "CMR Online Professional" product. As is described in greater detail below, each of the elements in breadcrumb control 248 is illustratively an actuatable link. Therefore, when a user actuates one of them, the user is navigated to the form or user interface display corresponding to that level in the unit hierarchy path 136. For instance, if the user actuates the "ACME 123" display element, the user is navigated to a form or user interface display corresponding to an entity that represents the "ACME 123" family of products identified by the "ACME 123" family node in unit hierarchy path 136.

Figure 2D:
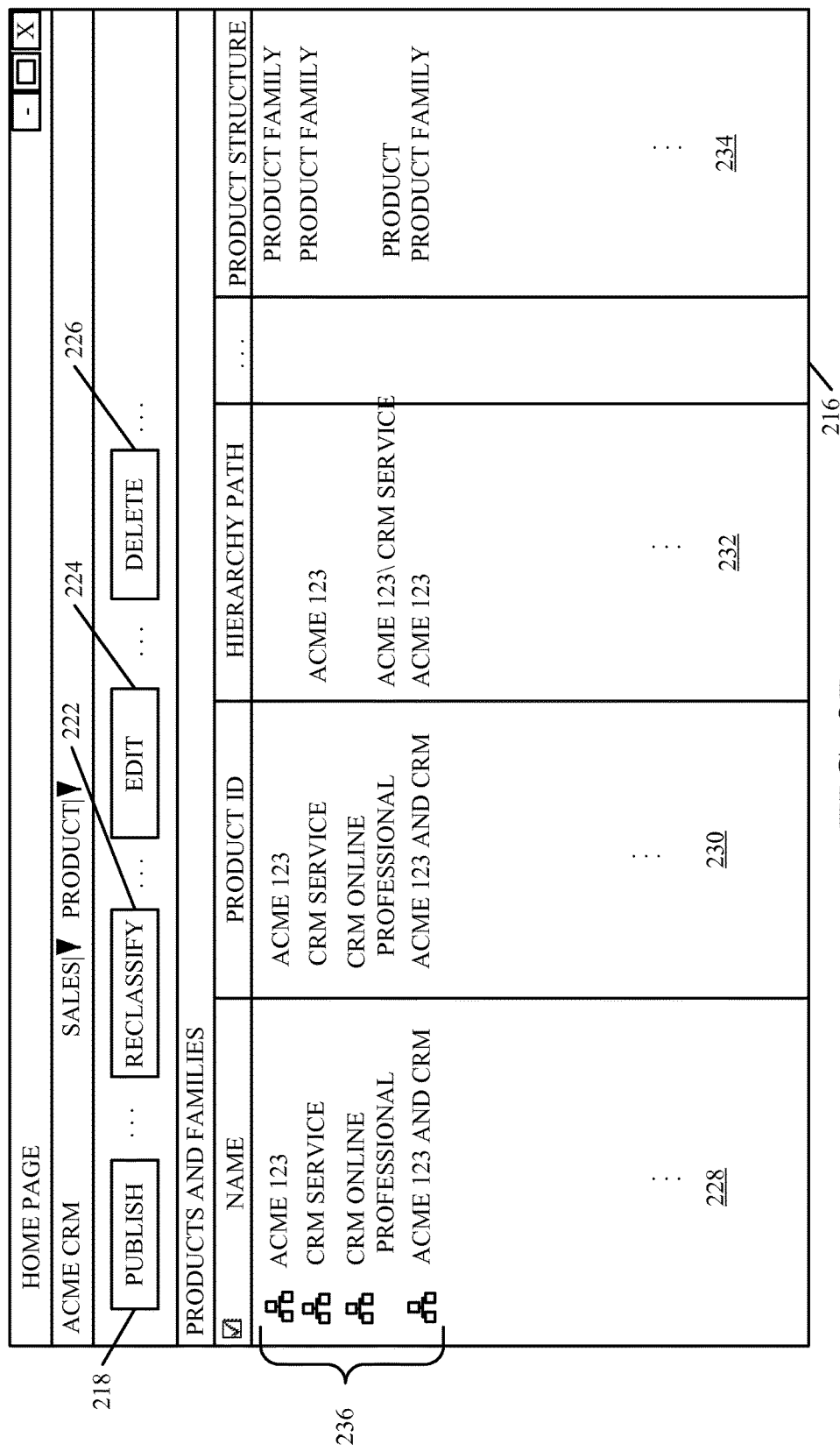

FIG. 2D shows the home page grid display 216 that is similar to that shown in FIG. 2A, and similar items are similarly numbered. However, it can be seen in FIG. 2D that both the "CRM Service" product family node and the "CRM Online Professional" product node have now been added to the unit hierarchy, and they are now displayed in grid display 216.

Figure 3:
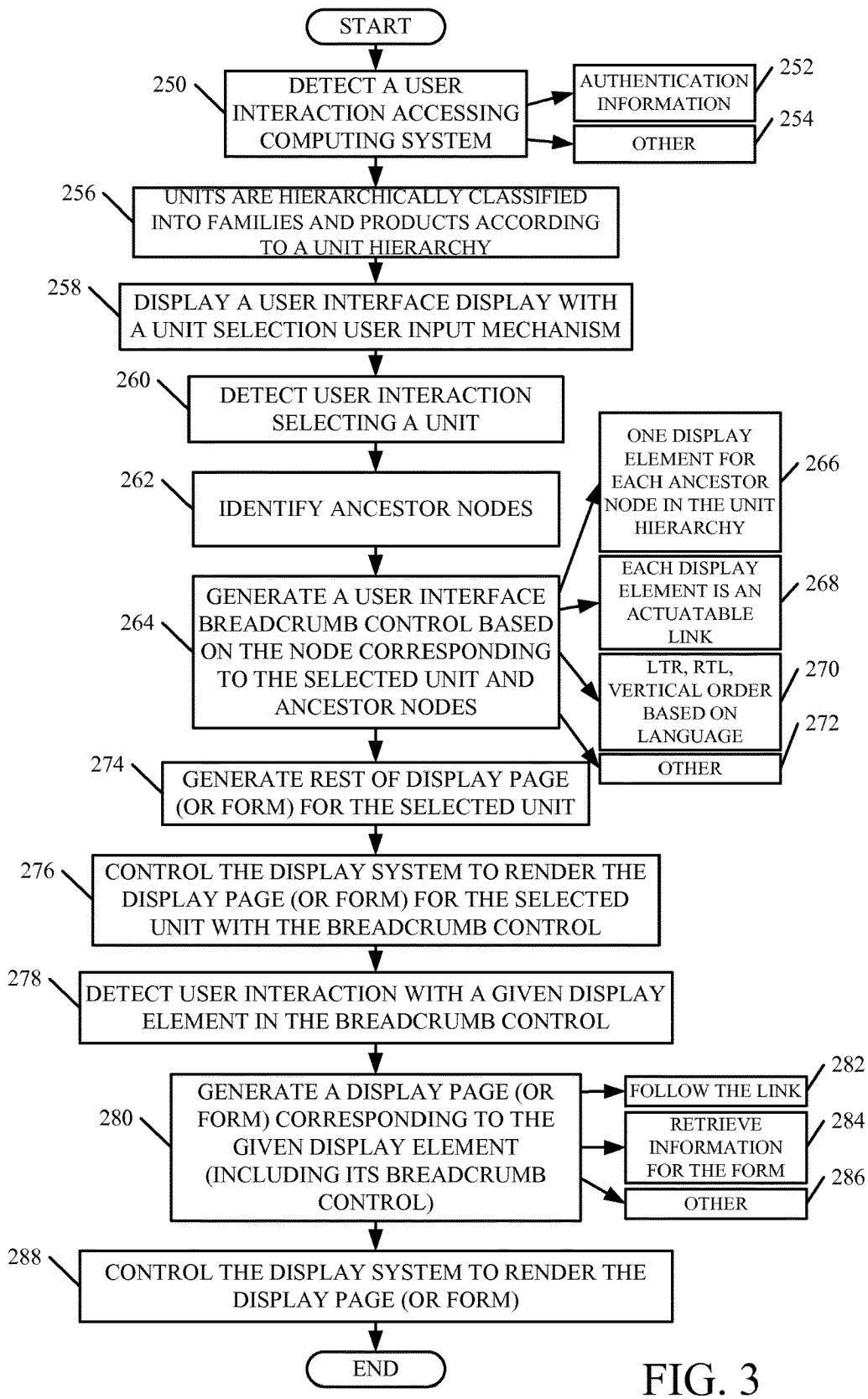
FIG. 3 shows a flow diagram illustrating one example of the operation of a breadcrumb control generator and navigation system.

FIG. 3 shows one example of the operation of breadcrumb control generator and navigation system 122. In one example, computing system 102 illustratively detects a user interaction indicating that the user wishes to access computing system 102. This is indicated by block 250 in FIG. 3. For instance, user 108 may provide authentication information 252 or other information 254. In response, application component 112 may launch a desired application 138, or system 102 may take other actions to allow user 108 to access system 102. It is assumed, for the sake of the present discussion, that there are already a number of units hierarchically classified into families in the unit hierarchy. This is indicated by block 256.

At some point during the operation, computing system 102 will illustratively display a user interface display with a unit selection user input mechanism. This is indicated by block 258. For instance, when user 108 wishes to view information for a unit (such as a product or product family), system 102 may provide a user interface display with a user actuatable icon representing the product. In that case, the user 108 may actuate (e.g., tap on or click on) that icon. Detecting user interactions selecting a unit is indicated by block 260. This is but one example of a how a user may provide such an interaction, and a wide variety of others can be used as well.

In response, ancestor node identifier 144 identifies ancestor nodes that are ancestors of the node representing the selected product. Identifying the ancestor nodes is indicted by block 262. By way of example, every product entity can have an attribute "ParentproductId" which stores the parent product information for that particular product. Ancestor node identifier 144 can be called to obtain a list of all ancestors for this product. Ancestor node identifier 144 then recursively adds the parent product in bottom up manner to a list until the current product has no parent (parentproductId is NULL) and then returns that list of ancestor nodes. Of course, this is only one example of how the ancestor nodes are identified.

Breadcrumb control generation component 146 then generates a user interface breadcrumb control based upon the node corresponding to the selected unit and the ancestor nodes 144. Generating a breadcrumb control is indicated by block 264. In one example, the breadcrumb control can have a separate display element for each ancestor node that was identified in the unit hierarchy path 136. This is indicated by block 266. Also, in one example, each of the display elements may be an actuatable link. This is indicated by block 268. Further, the display elements in the breadcrumb control are displayed in an order (e.g., left-to-right or right-to-left) based upon the particular language that system 102 is operating in. For instance, in those languages that are read left-to-right, then the breadcrumb control can display the display elements in an order starting with the ancestor nodes on the left and the descendent nodes right. Where the language is read right-to-left, the order of display of the display elements in the breadcrumb control may be reversed. The same can be true for languages read vertically, in which case the breadcrumb control can be oriented vertically. Of course, this is only an example. Displaying the display elements in the breadcrumb control based upon the particular language used is indicated by block 270. The breadcrumb control can be generated in other ways as well, and this is indicated by block 272.

Display system 114 then generates the rest of the display page or form corresponding to the selected unit. This is indicated by block 274.

Display system controller 150 then controls display system 114, and user interface component 116, to render the display page (or form) for the selected unit, along with the breadcrumb control. This is indicated by block 276. In an example where the breadcrumb control is formed of actuatable links, then navigation component 148 can illustratively detect user interaction with a given display element in the breadcrumb control. This is indicated by block 278. For instance, the user may actuate (such as click, double click, tap on, etc.) one of the display elements. The user may interact with a given display element in other ways as well.

In response, navigation component 148 illustratively generates a display page (or form) corresponding to the given display element that the user actuated (including its breadcrumb control). This is indicated by block 280. In doing so, navigation component 148 illustratively follows the navigatable link that the user actuated. This is indicated by block 282. It can retrieve information for the form corresponding to that navigatable link as indicated by block 284. It can generate the display page or form in other ways as well, and this is indicated by block 286.

As one example, a user may be viewing a form or display page corresponding to a product. However, the user may wish to view information corresponding to the family to which that product belongs. In order to do so, the user need simply actuate the navigatable link in the breadcrumb control that corresponds to the family, and the system will automatically navigate the user to a display page corresponding to the family. It will also generate the breadcrumb control for that family display page and display it on the family page. Navigation component 148 thus controls the display system 114 to render the display page or form for the family (or another display page or form) corresponding to an actuatable link that was actuated by the user in the breadcrumb control of the previous page. This is indicated by block 288.

System 122 thus significantly improves the performance of computing system 102. The system advantageously displays the breadcrumb control so that the user can easily see where, in the unit hierarchy path 136, the particular product or unit is classified. This advantageously avoids the user 108 having to navigate back to a main page in computing system 102, and then navigate forward to the desired family page. Therefore, it significantly avoids navigation steps within system 102. This not only reduces the number of round trips to data store 120 in order to generate the desired displays for user 108, but this can lead to a reduction in network traffic as well. Similarly, because the user need not open a large number of different forms and have them open on his or her device, this can also advantageously reduce the processing and memory overhead associated with rendering the displays. The user can be viewing a unit display (or family display or another display) and immediately see where the unit or family or other item is categorized in unit hierarchy path 136, because the breadcrumb control is automatically generated and displayed. The user can then easily navigate to a different level in the hierarchy by simply actuating one of the display elements in the breadcrumb control. This significantly enhances not only the efficiency of user 108, but the performance of system 102.

Figure 4:
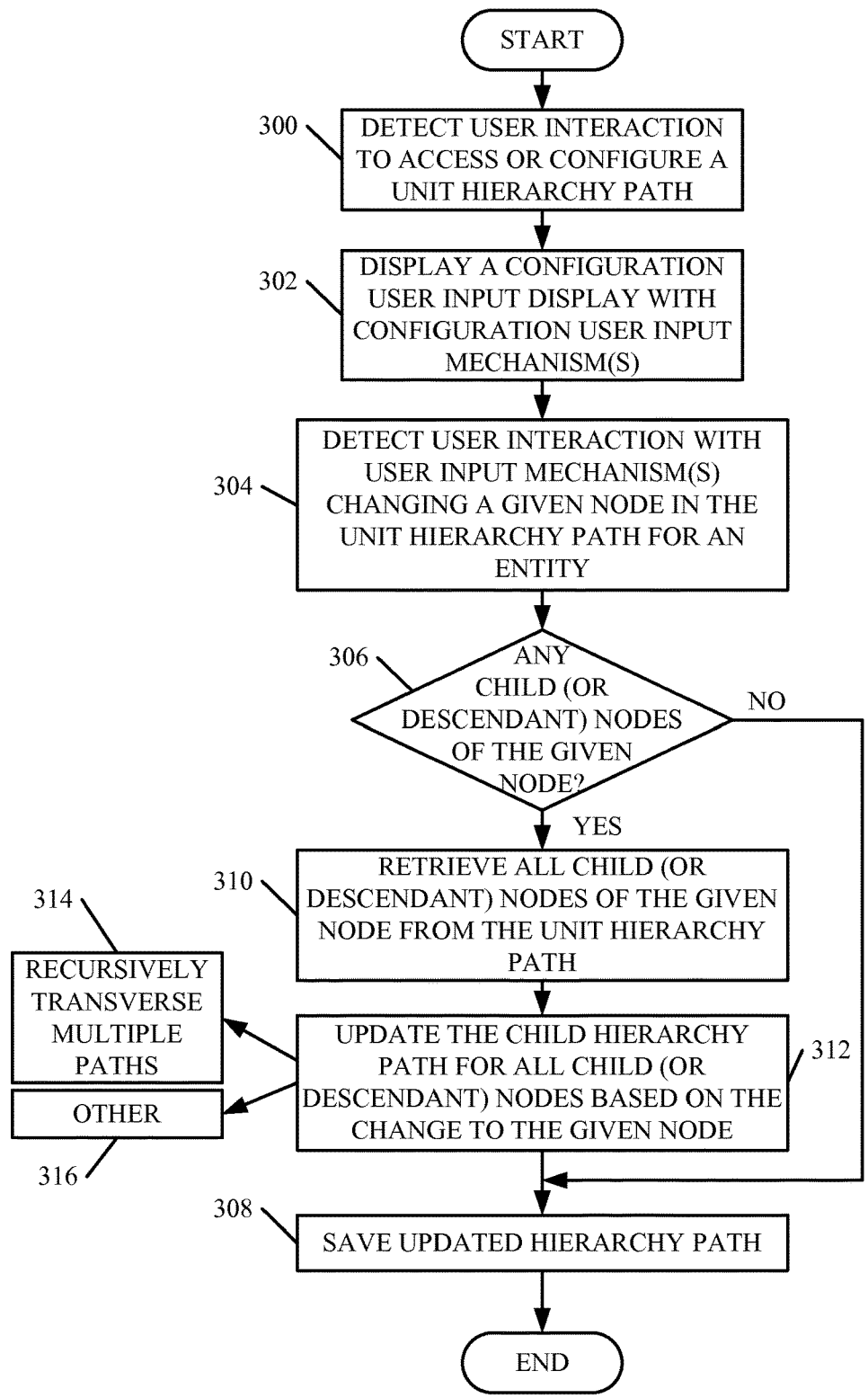
FIG. 4 is a flow diagram illustrating an example of the operation of a recursive hierarchy path modifier.

FIG. 4 is a flow diagram illustrating one example of the operation of hierarchy configuration system 124, in allowing user 108 to reconfigure (or modify) an existing unit hierarchy path 136. Configuration display generator 154 first detects user interaction indicating that the user wishes to access or configure a unit hierarchy path 136 for a given product or family. This is indicated by block 300 in FIG. 4. It then generates a configuration user input display with configuration user input mechanisms that can be actuated by user 108 in order to reconfigure or modify the unit hierarchy path 136. This is indicated by block 302. Configuration detector 156 then detects user interaction with the user input mechanisms, changing a given node in the unit hierarchy. This is indicated by block 304. By way of example, and the for sake of discussion only, assume that user 108 provides an input changing the name of a family node in unit hierarchy path 136. The family node may have multiple descendent nodes along a single hierarchy path, or even along multiple different hierarchy paths. For instance, the family node may have multiple direct child nodes, each of which may have their own child nodes.

Child (or descendent) node identifier 160 then determines whether the node that has just been modified by the user has any child (or descendent) nodes. This is indicated by block 306. If there are no child (or descendent) nodes, then system 124 simply needs to save the modified hierarchy path, as it was just modified by the user, on the entity being modified. This is indicated by block 308.

However, if, at block 306, it is determined that there are child nodes, then recursive hierarchy path modifier 162 retrieves all of the child (or descendent) nodes of the given node (that was just modified by the user) from unit hierarchy path 136. This is indicated by block 310. Recursive hierarchy path modifier 162 then updates the child hierarchy path for all of the child (or descendent) nodes, based upon the change to the given node that the user just made. This is indicated by block 312. In doing so, modifier 162 can recursively traverse multiple different paths from the currently modified node to the leaf nodes in hierarchy path 136, through its direct child nodes, modifying the hierarchy path, as needed. This is indicated by block 314. Of course, it can modify the hierarchy paths in other ways as well, and this is indicated by block 316.

As an example, assume that the user changes the name of a family node on a family entity. In that case, the path names for each of its descendent nodes will be modified as well. Therefore, recursive hierarchy path modifier 162 recursively traverses the multiple paths through the various descendent nodes, modifying the name of the hierarchy path for each of those descendent nodes.

Again, once the modifications have been made, the updated unit hierarchy paths 136 are saved for use by the runtime system. This is indicated by block 308.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
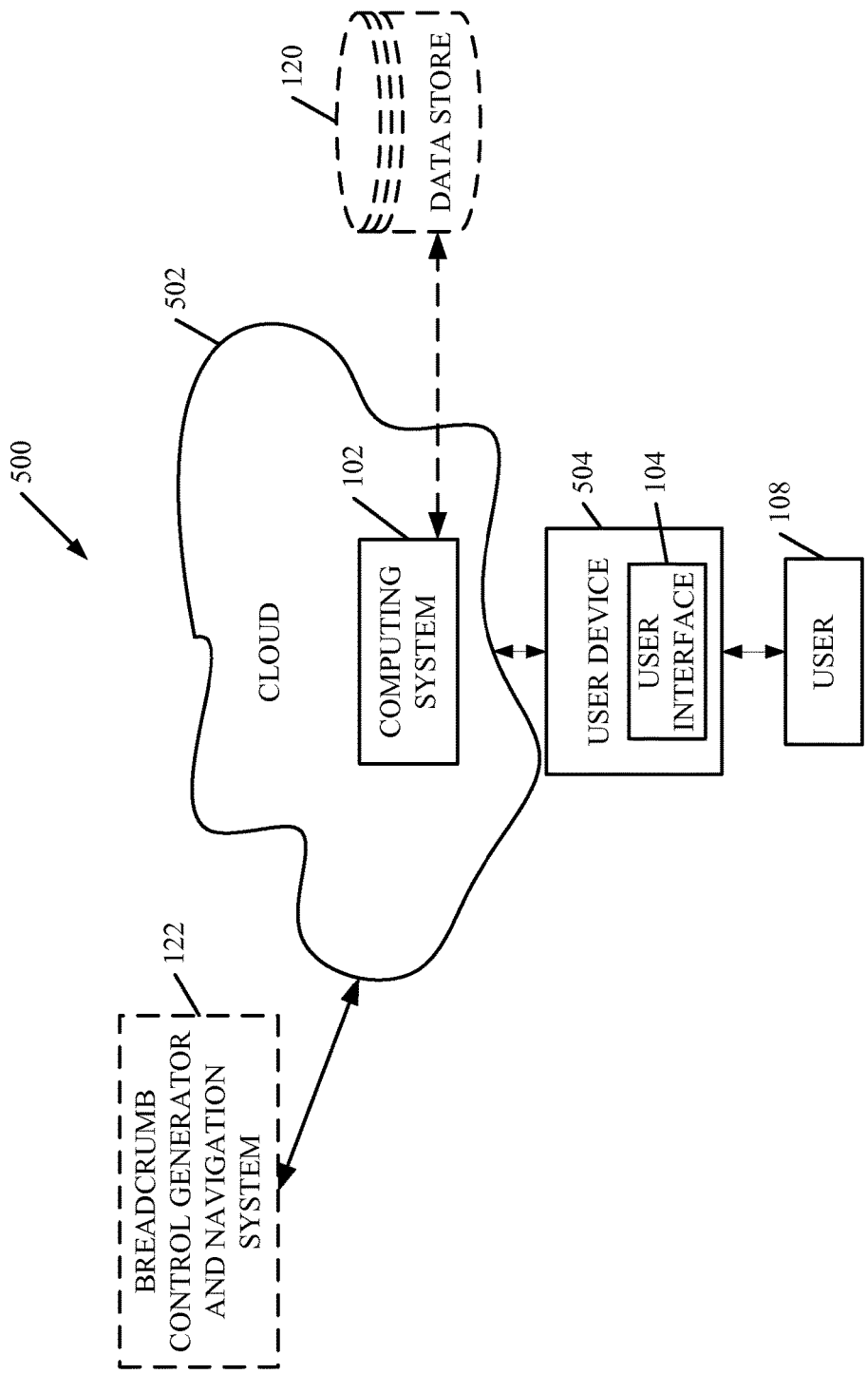
FIG. 5 is a block diagram of one example of the architecture shown in FIG. 1 deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that computing system 102 is located in cloud 502 (which can be public, private, or a combination where portions are public while others are private). Therefore, user 108 uses a user device 504 to access those systems through cloud 502.

FIG. 5 also depicts another example of a cloud architecture. FIG. 5 shows that it is also contemplated that some elements of computing system 102 are disposed in cloud 502 while others are not. By way of example, data store 120 can be disposed outside of cloud 502, and accessed through cloud 502. In another example breadcrumb control generator and navigation system 122 can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
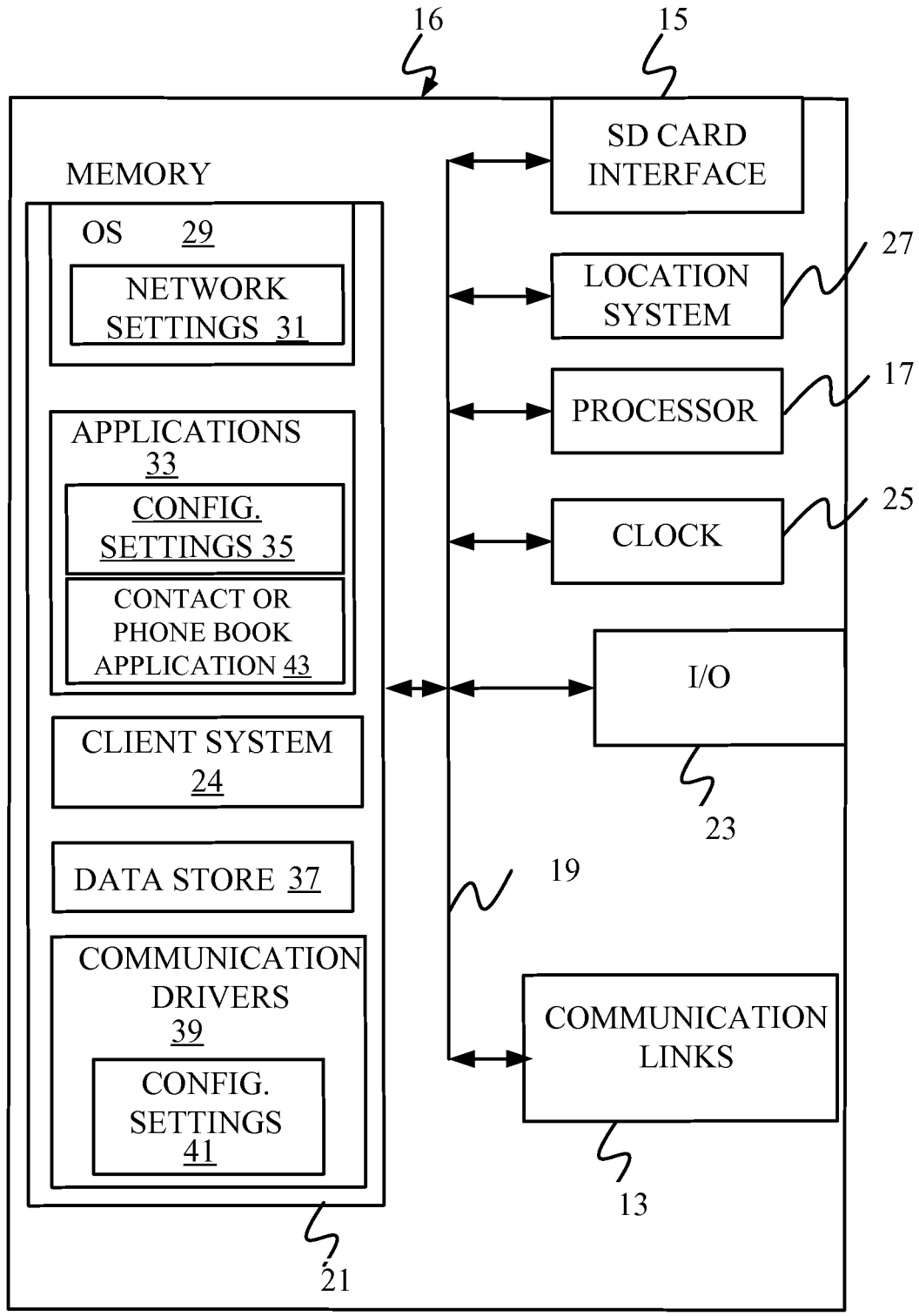
FIGS. 6-8 show various examples of mobile devices that can be used in the architectures mentioned above.
Figure 7:
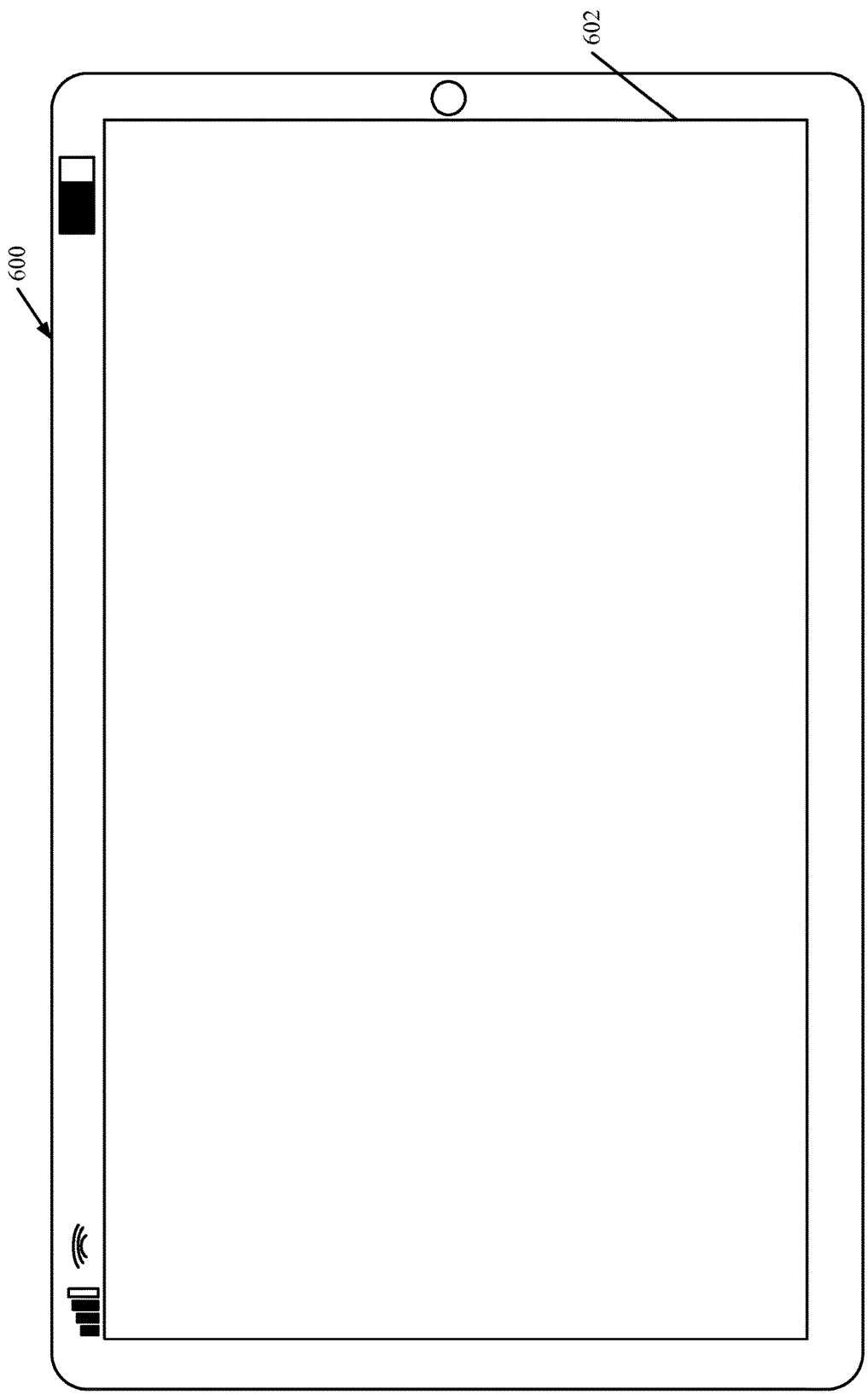
Figure 8:
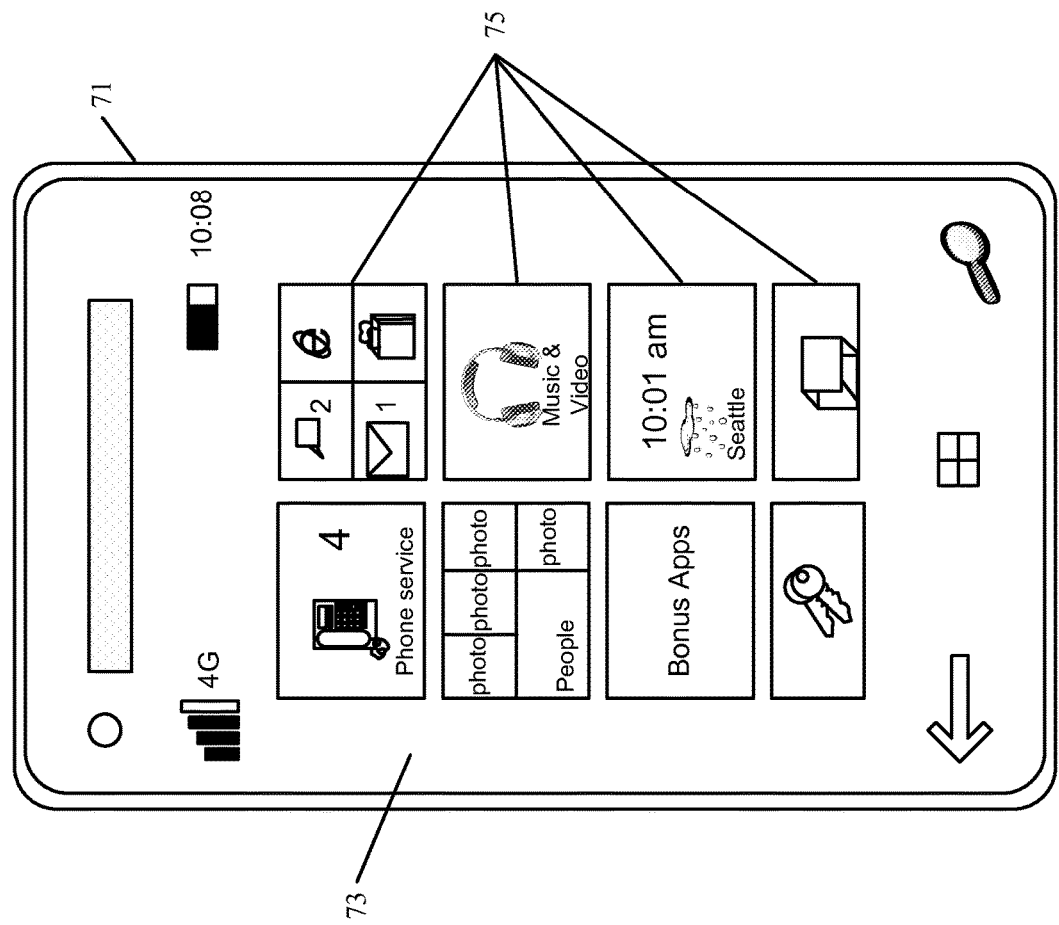

FIG. 6 is a simplified block diagram of one illustrative embodiment of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of computing system 102 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors/servers 110 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 7, computer 600 is shown with user interface display displayed on the display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can includes an antenna for receiving cellular phone signals such as General Packet Radio Service (GPRS) and 1xrtt, and Short Message Service (SMS) signals. In some examples, the phone also includes a Secure Digital (SD) card slot that accepts a SD card.

The mobile device can also be a personal digital assistant (PDA) or a multimedia player or a tablet computing device, etc. (hereinafter referred to as a PDA). The PDA includes an inductive screen that senses the position of a stylus (or other pointers, such as a user's finger) when the stylus is positioned over the screen. This allows the user to select, highlight, and move items on the screen as well as draw and write. The PDA also includes a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 8 shows except that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
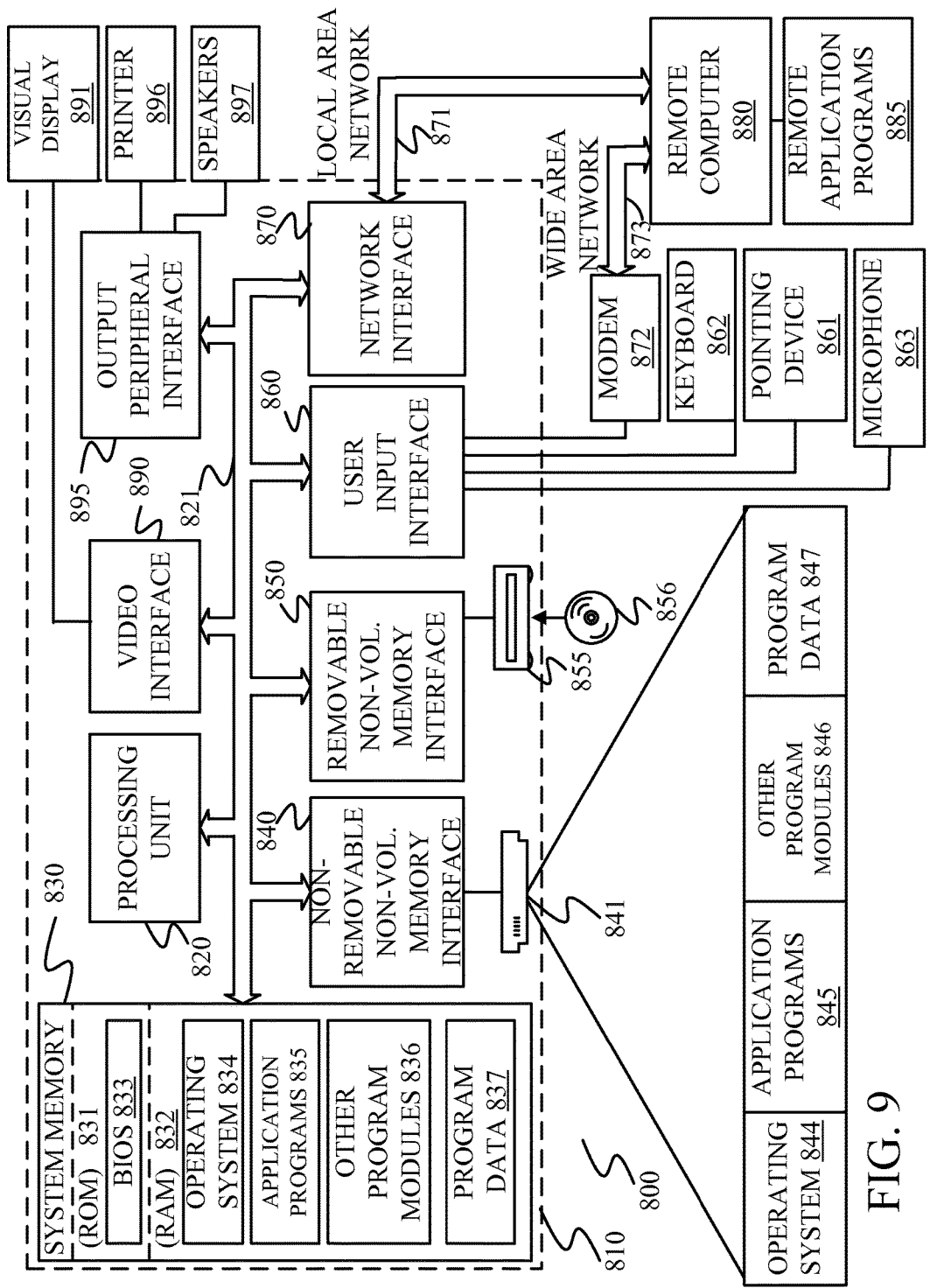
FIG. 9 is a block diagram of one example of a computing environment.

FIG. 9 is one embodiment of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers 110), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a user interface component that detects user interaction with a unit selection user input mechanism selecting a unit;

a hierarchy accessing component that accesses a unit hierarchy, that hierarchically organizes units into unit families based on identified characteristics of the units, to identify a selected unit node in the unit hierarchy corresponding to the selected unit;

an ancestor node identifier that identifies ancestor nodes in the unit hierarchy that are ancestor nodes to the selected unit node;

a breadcrumb control generation component that generates a breadcrumb user interface control, based on the identified ancestor nodes, indicative of a location, within the unit hierarchy, of the selected unit node relative to the identified ancestor nodes; and a display system controller that controls the user interface component to display the breadcrumb user interface control on a user interface display page corresponding to the selected unit.

Example 2 is the computing system of any or all previous examples wherein the breadcrumb control generation component generates the breadcrumb user interface control to include a plurality of different display elements, each corresponding to an identified ancestor node in the unit hierarchy.

Example 3 is the computing system of any or all previous examples wherein the breadcrumb control generation component generates the breadcrumb user interface control to arrange the plurality of display elements in an ordered path to indicate a hierarchical relationship among the identified ancestor nodes in the unit hierarchy.

Example 4 is the computing system of any or all previous examples wherein each of the plurality of display elements comprises an actuatable link, and further comprising:

a navigation component that detects user actuation of a given display element in the breadcrumb user interface control and navigates to a user interface display for a given ancestor node corresponding to the given display element.

Example 5 is the computing system of any or all previous examples wherein the hierarchy accessing component accesses the unit hierarchy to identify a location of the given ancestor node in the unit hierarchy and wherein the ancestor node identifier identifies ancestor nodes to the given ancestor node, and wherein the breadcrumb control generation component generates a given breadcrumb user interface control based on the identified ancestor nodes of the given ancestor node.

Example 6 is the computing system of any or all previous examples and further comprising:

a hierarchy configuration system that detects user interactions configuring a selected node in the unit hierarchy and modifies the unit hierarchy based on the detected user interactions.

Example 7 is the computing system of any or all previous examples wherein the hierarchy configuration system further comprises:

a descendent node identifier that identifies descendent nodes, of the selected node, in the unit hierarchy; and a recursive hierarchy path modifier that modifies the hierarchy paths for the identified descendent nodes based on modifications to the selected node.

Example 8 is the computing system of any or all previous examples wherein the recursive hierarchy path modifier recursively modifies the hierarchy paths by recursively traversing multiple different paths from the selected node to leaf nodes in the unit hierarchy.

Example 9 is the computing system of any or all previous examples wherein each leaf node in the unit hierarchy corresponds to a product of an organization deploying the computing system.

Example 10 is a computer implemented method, comprising:

detecting user interaction with a unit selection user input mechanism selecting a unit;

identifying a selected unit node in a unit hierarchy corresponding to the selected unit, the unit hierarchy hierarchically organizing units into unit families based on identified characteristics of the units; identifying ancestor nodes in the unit hierarchy that are ancestor nodes to the selected unit node;

generating a breadcrumb control, based on the identified ancestor nodes, indicative of a location, within the unit hierarchy, of the selected unit node relative to the identified ancestor nodes; and controlling a user interface component to display the breadcrumb control on a user interface display page corresponding to the selected unit.

Example 11 is the computer implemented method of any or all previous examples and further comprising:

detecting a user configuration input modifying a given node in the unit hierarchy; and modifying a hierarchy path for descendent nodes, of the given node, based on modifications to the given node.

Example 12 is the computer implemented method of any or all previous examples wherein modifying a hierarchy path for the descendent nodes comprises:

identifying all descendent nodes of the given node in the unit hierarchy; and recursively traversing all paths from the given node to leaf nodes in the unit hierarchy, modifying the hierarchy path for all the identified descendent nodes.

Example 13 is the computer implemented method of any or all previous examples wherein generating the breadcrumb control comprises:

generating a plurality of display elements, one display element corresponding to each identified ancestor node; and arranging the display elements in an order to reflect a hierarchical relationship of the identified ancestor nodes to the selected unit node in the unit hierarchy.

Example 14 is the computer implemented method of any or all previous examples wherein generating a plurality of display elements comprises:

generating each of the plurality of display elements as a user actuatable link to a display page for the ancestor node corresponding to the display element.

Example 15 is the computer implemented method of any or all previous examples and further comprising:

detecting user actuation of a given user actuatable link on the breadcrumb control; and navigating to the display page for the ancestor node corresponding to the given user actuatable link.

Example 16 is a computing system, comprising:

a configuration display generator that generates a configuration display with configuration user input mechanisms for configuring a unit hierarchy that hierarchically organizes units into unit families based on identified characteristics of the units, a configuration detector that detects user interactions with the configuration user input mechanisms configuring a selected node in the unit hierarchy and modifies the selected node based on the detected user interactions;

a descendent node identifier that identifies descendent nodes, of the selected node, in the unit hierarchy; and a recursive hierarchy path modifier that modifies the hierarchy paths for the identified descendent nodes based on modifications to the selected node.

Example 17 is the computing system of any or all previous examples and further comprising:

a user interface component that detects user interaction with a unit selection user input mechanism selecting a unit;

a hierarchy accessing component that accesses the unit hierarchy to identify a selected unit node in the unit hierarchy corresponding to the selected unit;

an ancestor node identifier that identifies ancestor nodes in the unit hierarchy that are ancestor nodes to the selected unit node;

a breadcrumb control generation component that generates a breadcrumb user interface control, based on the identified ancestor nodes, indicative of a location, within the unit hierarchy, of the selected unit node relative to the identified ancestor nodes; and a display system controller that controls a user interface component to display the breadcrumb user interface control on a user interface display page corresponding to the selected unit.

Example 18 is the computing system of any or all previous examples wherein the breadcrumb control generation component generates the breadcrumb user interface control to include a plurality of different display elements, each corresponding to an identified ancestor node in the unit hierarchy, and wherein the breadcrumb control generation component generates the breadcrumb user interface control to arrange the plurality of display elements in an ordered path to indicate a hierarchical relationship among the identified ancestor nodes in the unit hierarchy.

Example 19 is the computing system of any or all previous examples wherein each of the plurality of display elements comprises an actuatable link, and further comprising:

a navigation component that detects user actuation of a given display element in the breadcrumb user interface control and navigates to a user interface display for a given ancestor node corresponding to the given display element.

Example 20 is the computing system of any or all previous examples wherein the hierarchy accessing component accesses the unit hierarchy to identify a location of the given ancestor node in the unit hierarchy and wherein the ancestor node identifier identifies ancestor nodes to the given ancestor node, and wherein the breadcrumb control generation component generates a given breadcrumb user interface control based on the identified ancestor nodes of the given ancestor node.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor;
memory coupled to the processor and containing instructions that, when executed by the processor, cause the computing system to;
based on a detected user interaction with a product selection user input mechanism, select a product record corresponding to a product represented in the computing system;
access a product hierarchy path associated with the selected product record, wherein the product hierarchy path comprises a selected product node that represents the product and hierarchically organizes products into a product family based on an identified characteristic of the products;
identify an ancestor node in the product hierarchy path that is, an ancestor node to the selected product node;
generate a breadcrumb user interface control, based on the identified ancestor node, indicative of a location, within the product hierarchy path, of the selected product node relative to the identified ancestor node;
display the breadcrumb user interface control on a user interface display page corresponding to the selected product record; and
detect user interaction with a configuration user Input mechanism that configures a selected node in the product hierarchy path;
modify the product hierarchy path based on the detected user interaction; and
automatically recursively traverse the product hierarchy path to;
identify a plurality of descendent nodes, of the selected node, in the product hierarchy path; and
modify corresponding duct records, represented by the identified plurality of descendent nodes, to include the modification to the product hierarchy path.

2. The computing system of claim 1 wherein the instructions cause the computing: system to:
identify a plurality of additional ancestor nodes in the product hierarchy path; and
generate the breadcrumb user interface control to include a plurality of different display elements, each corresponding to one of the identified ancestor nodes in the product hierarchy path.

3. The computing system of claim 2 wherein the instructions cause the computing system to generate the breadcrumb user interface control to arrange the plurality of display elements in an ordered path to indicate a hierarchical relationship among the identified ancestor nodes in the product hierarchy path.

4. The computing system of claim 3 wherein each of the plurality of display elements comprises an actuatable link, and the instructions cause the computing system to:
detect user actuation of a given display element in the breadcrumb user interface control and navigate to a user interface display for an ancestor node corresponding to the given display element.

5. The computing system of claim 4 wherein the instructions cause the computing system to identify ancestor nodes to the given ancestor node, and generate a given breadcrumb user interface control based on the identified ancestor nodes of the given ancestor node.

6. The comp ting system of claim 1 wherein the instructions cause the computing system to recursively modify the product hierarchy path by recursively traversing multiple different paths from the selected node to leaf nodes in the product hierarchy path.

7. The computing system of claim 6 wherein each leaf node in the product hierarchy path corresponds to a product of an organization deploying the computing system.

8. A computer implemented method, comprising:
based on a detected user interaction with a unit selection user input mechanism, selecting a unit record corresponding to a unit;
accessing a unit hierarchy path associated with the selected unit record, wherein the unit hierarchy path comprises a selected unit node that represents the unit and hierarchically organizes units into a unit family based on an identified characteristic of the units;
identifying ancestor nodes in the unit hierarchy path that are ancestor nodes to the selected unit node;
generating a breadcrumb user interface control, based on the identified ancestor nodes, indicative of a location, within the unit hierarchy path, of the selected unit node relative to the identified ancestor nodes;
controlling a user interface component to display the breadcrumb user interface control on a user interface display page corresponding to the selected unit;
detecting a user configuration input modifying the selected node in the unit hierarchy path;
identifying all descendent nodes of the selected node in the unit hierarchy path;

automatically recursively traversing the unit hierarchy path to:
  identify all paths from the selected node to leaf nodes in the unit hierarchy path, and
  modify corresponding unit records, represented by the identified descendent nodes, to include the modification to the unit hierarchy path.

9. The computer implemented method of claim 8 wherein generating the breadcrumb user interface control comprises:
  generating a plurality of display elements, one display clement corresponding to each identified ancestor node; and
  arranging the display elements in an order to reflect a hierarchical relationship of the identified ancestor nodes to the selected unit node in the unit hierarchy path.

10. The computer implemented method of claim 9 wherein generating a plurality of display elements comprises:
  generating each of the plurality of display elements as a user actuatable link to a display page for the ancestor node corresponding to the display element.

11. The computer implemented method of claim 10 and further comprising:
  detecting user actuation of a given user actuatable link on the breadcrumb user interface control; and
  navigating to the display page for the ancestor node corresponding to the given user actuatable link.

12. A computing system, comprising:
  a processor;
  memory coupled to the processor and containing instructions that, when executed by the processor, provide a configuration display generator, a configuration detector, a descendent node identifier, and a recursive hierarchy path modifier;
  the configuration display generator being configured to generate a configuration grid display having a name portion and a unit identifier portion, the configuration grid display also having configuration user input mechanisms for configuring a unit hierarchy path that hierarchically organizes units into unit families based on identified characteristics of the units,
  the configuration detector being configured to detect user interactions with the configuration user input t mechanisms configuring a selected node in the unit hierarchy path and modifies the selected node based on the detected user interactions;
  the descendent node identifier being configured to identify descendent nodes, of the selected node, in the unit hierarchy path; and
  the hierarchy path modifier being configured to:
    automatically traverse the unit hierarchy path to:
      identify a plurality of descendent nodes, of the selected node, in the unit hierarchy path ; and
      modify corresponding unit records, represented by the identified plurality of descendent nodes, to include the modification to the unit hierarchy path.

13. The computing s system of claim 12 wherein the instructions, when executed, provide:
  a user interface component configured to detect user interaction with a unit selection user input mechanism selecting a unit;
  a hierarchy accessing component configured to access the unit hierarchy path to identify a selected unit node in the unit hierarchy path corresponding to the selected unit;
  an ancestor node identifier configured to identify ancestor nodes iii the unit hierarchy path that are ancestor nodes to the selected unit node;
  a breadcrumb control generation component configured to generate a breadcrumb user interface control, based on the identified ancestor nodes, indicative of a location, within the unit hierarchy path, of the selected unit node relative to the identified ancestor nodes; and
  a display system controller configured to control a user interface component to display the breadcrumb user interface control on a user interface display page corresponding to the selected unit.

14. The computing system of claim 13 wherein the breadcrumb control generation component is configured to generate the breadcrumb user interface control to:
  include a plurality of different display elements, each corresponding to a identified ancestor node in the unit hierarchy path, and
  arrange the plurality of display elements in an ordered path to indicate a hierarchical relationship among the identified ancestor nodes in the unit hierarchy path.

15. The computing system of claim 14 wherein each of the plurality of display elements comprises an actuatable link, and the instructions, when executed, provide:
  a navigation component configured to detect user actuation of a given display element in the breadcrumb user interface control and navigate to a user interface display for a given ancestor node corresponding to the given display element.

16. The computing system of claim 15 wherein the hierarchy accessing component is configured to access the unit hierarchy path to identify a location of the given ancestor node in the unit hierarchy path and wherein the ancestor node identifier is configured to identify ancestor nodes to the given ancestor node, and wherein the breadcrumb control generation component is configured to generate a given breadcrumb user interface control based on the identified ancestor nodes of the given ancestor node.

* * * * *